Figure 1:
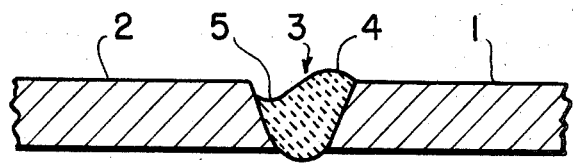

United States Patent
Kantor et al.

[15] 3,650,734
[45] Mar. 21, 1972

[54] WROUGHT WELDING ALLOYS

[72] Inventors: Thomas A. Kantor, Pittsburgh; Ronald K. Bowen, Bethel Park, both of Pa.

[73] Assignee: Cyclops Corporation, Universal-Cyclops Specialty Steel Division, Pittsburgh, Pa.

[22] Filed: June 16, 1969

[21] Appl. No.: 833,464

[52] U.S. Cl. ................................................75/171
[51] Int. Cl. ................................................C22c 19/00
[58] Field of Search ............75/171, 170, 82; 148/32, 32.5

[56] References Cited

UNITED STATES PATENTS 2,570,193  10/1951  Bieber et al. ..............................75/171
3,207,599  9/1965   Franklin et al. ..........................75/171

Primary Examiner—Richard O. Dean
Attorney—Webb, Burden, Robinson & Webb

[57] ABSTRACT

A welding alloy and a method of making same containing a controlled amount of aluminum and calcium, for example, as represented by the formula $Al + 31.8\, Ca < 3,500$ where the compositions are given in parts per million for the elimination of fusion zone undercutting during the welding of said alloy.

4 Claims, 2 Drawing Figures

Patented March 21, 1972

3,650,734

INVENTORS.
Thomas A. Kantor
Ronald K. Bowen

BY
Webb Burden Robinson &
 Webb

THEIR ATTORNEYS

WROUGHT WELDING ALLOYS

This invention relates to welding alloys. More particularly, it relates to a method of producing wrought welding alloys in which the calcium and aluminum contents are greatly limited to eliminate fusion zone undercutting.

Many wrought welding alloys have been developed for the aerospace industry and the like. The fabrication of these various alloys into particular components has often been hampered by occurrences of a defect located in the weld area between an alloy or alloys joined by a fusion welding process. This defect has been more precisely defined as fusion weld bead undercutting or more simply, fusion zone undercutting. The propensity of this defect to occur varies with the particular alloys employed. In particular, it has been a common defect with certain of the wrought heat resisting alloys including nickel base alloys, cobalt-chromium-nickel base alloys (commonly referred to as cobalt base alloys) and the standard and higher-nickel austenitic alloys (commonly referred to as iron base alloys) as generally defined in *Metals Handbook*, Properties and Selection, Vol. 1, 8th Ed., page 467, Table I.

Our invention provides a method for producing a wrought alloy in which fusion zone undercutting is eliminated in a fabricated and welded alloy of our composition. Further, our invention allows for a predictability of welding success based on certain empirical relationships particularly adapted to the specific alloy employed. Because of this predictability, a simple go-no go system can be established based on the particular threshold values of aluminum and calcium applicable to the particular alloy. This then enables alloys to be manufactured to aim analyses and which will not exhibit fusion zone undercutting during later processing, but at the same time provides a set of decision rules for predicting the likelihood of the weld defect should the actual analyses wander from the aim analyses of the alloy. By eliminating fusion zone undercutting, a more consistent weld is also obtained from the standpoint of appearance; thereby resulting in a more attractive weld, which often times cannot be distinguished from the parent metal after normal buffing operation.

Our invention is a method for producing a wrought heat resisting alloy containing a controlled amount of aluminum and calcium, for example, as represented by the formula $Al + 31.8 Ca < 3,500$ where the aluminum and calcium compositions are given in parts per million, for the elimination of fusion zone undercutting during the welding of said alloy.

Figure 2:
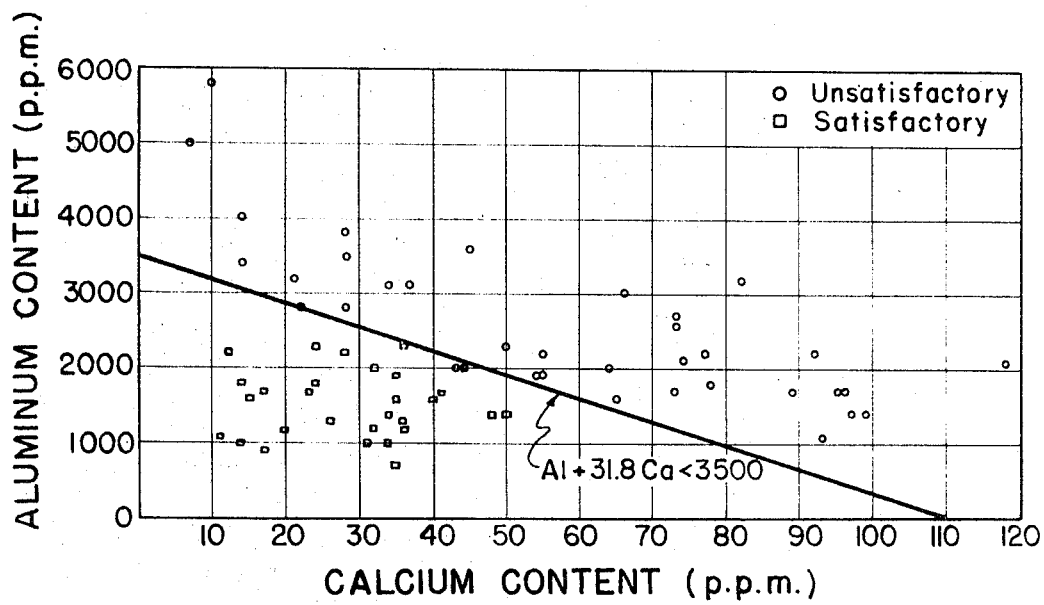

In the accompanying drawings, we have illustrated certain features of our invention in which:

FIG. 1 is a drawing illustrating the particular weld defect cured by our invention; and FIG. 2 is a graph showing a plot of calcium content versus aluminum content of the samples employed in determining the empirical formula $Al + 31.8 Ca < 3500$.

The particular weld defect termed fusion weld bead undercutting or simply fusion zone undercutting is illustrated in FIG. 1 where two components 1 and 2 of parent metal are joined by fusion welding to form a weld fusion zone 3 between the components 1 and 2. The weld bead or fusion zone has an upper surface 4 exhibiting a depression 5 which is the undercut. This undercut cannot be tolerated in most applications to which these types of alloys are directed. Failures have occurred by cracking in jet engine components and in other cases the poor appearance of the weld has been objectionable.

It has been found that this weld is correlated to the aluminum and calcium composition of the base alloy and more particularly by limiting the amounts of aluminum and calcium in the alloy to smaller proportions than employed in similar alloys heretofore, the defect can be eliminated from the fusion welded components.

This general principle of greatly limiting the calcium and aluminum to prevent fusion weld undercutting has application to a variety of nickel base wrought alloys such as those found in *Metals Handbook* referred to hereinbefore. More particularly, the following alloys illustrated in Table I, manufactured with greatly limited aluminum and calcium contents, will be free of fusion zone undercutting in the welded product.

Aluminum and calcium are used routinely in the general

TABLE I.—ALLOY COMPOSITIONS ADAPTED TO ELIMINATION OF FUSION ZONE UNDERCUTTING

| Grade Designation | C | Mn | Si | S | P | Cr | W | V | Ni | Mo | Co | Fe | B | Zr | Cb+Ta | N₂ |
|---|---|---|---|---|---|---|---|---|---|---|---|---|---|---|---|---|
| HX | .15 max | 1.00 max | 1.00 max | .030 max | .040 max | 20.50/23.0 | .20/1.00 | | Bal | 8.00/10.00 | .50/2.50 | 17.00/20.00 | .010 max | .15 max | | |
| 625 | .10 max | .50 max | .50 max | .015 max | .015 max | 20.00/23.00 | | | Bal | 8.00/10.00 | 1.00 max | 5.00 max | | | 3.15/4.15 | |
| HC | .08 max | 1.00 max | 1.00 max | .025 max | .030 max | 14.50/16.50 | 3.00/3.45 | .35 max | Bal | 15.00/17.00 | 2.50 max | 4.00/7.00 | | | | | types of alloys described in Table I. The deoxidizing abilities of calcium and aluminum have been known for years, as has the grain refining properties of aluminum and the steel cleaning properties of various calcium additions. Aluminum and calcium have also been claimed to improve machinability, produce improved ductility, electrical characteristics, high temperature oxidation resistance and workability. However, for these purposes, aluminum up to 1.5 percent and calcium in excess of 0.01 percent are not uncommon. We have found for a number of different alloys that calcium contents in excess of 50 parts per million (0.005 percent) result in fusion zone undercutting even when the aluminum is very low. On the other hand, we have found the aluminum contents up to 3,500 parts per million (0.35 percent) with low calcium contents can be tolerated for the 625 alloy (see Table I), whereas lower aluminum contents with comparable calcium contents are required in the HX alloys (see Table I) for the elimination of fusion zone undercutting.

The particular work conducted has also shown that fusion zone undercutting is not a function of oxygen content, steel cleanliness, steelmaking process or subsequent processing, but is an independent property to which greatly restricted amounts of calcium and aluminum must be employed to obtain satisfactory results.

The method of producing the various wrought heat resisting alloys which will result in welds free from fusion zone undercutting comprises employing restricted amounts of aluminum and calcium in the alloy. The limiting amounts can be represented by the general linear equation $Al + KCa < W$ where Al and Ca are in parts per million, $K$ is an experimentally determined constant and $W$ is the resulting constant which determines the combined composition limits. The constant $K$ is not a measure of the relative importance of the variable, but is an adjustment on the order of magnitude of the variable.

It is possible through experimentation to determine the threshold values for aluminum and calcium in these particular alloys which, if exceeded, result in the defect. It has been found for the wrought nickel base alloy described as HX in Table I that the empirical formula $Al + 31.8\ Ca < 3,500$ represents the limiting relationship in the manufacture of the alloy for eliminating fusion weld zone undercutting. All composition limits as used herein are expressed in weight percent except calcium and aluminum which are represented in parts per million.

The support for this empirical formula is shown in FIG. 2 where 64 different heats of this general heat type were tested, with the results showing all acceptable welds coming from heats in which the calcium and aluminum analyses met the limits of the equation. The welds exhibiting poor results came from heats in which the calcium and aluminum analyses did not meet the limits of the equation, i.e., exceeded 3,500 parts per million. At very low aluminum contents, 1,000 parts per million or less or very low calcium contents, 10 parts per million or less, a highly superficial condition occurred in the weld zone which did not result in fusion weld zone undercutting but which did give an appearance different from the remainder of the samples.

A standardized welding procedure was employed on all the samples. It comprised using samples approximately 1¼ inches × 15 inches and 0.045 inch thick. The material was randomly chosen from sheets of the particular vacuum or air atmosphere melted heats which had been previously cold rolled, annealed and pickled. The welding itself was conducted without filler wire, using a one-sixteenth inch diameter, 2 percent thoriated tungsten, pointed electrode exposed a total of three-sixteenths inch. The arc gap was 0.045 inch; the amount of current was one ampere per 0.001 inch of thickness; the electrode traveled a speed of 7 inches per minute; the shielding gas was welding quality argon at 25 cubic feet per hour; and the argon was used for a back purge at 30 cubic feet per hour.

As indicated hereinbefore, the aluminum and calcium compositions of the materials on which weld tests were made are shown in FIG. 2. The complete data, including all elements investigated, for the 64 heats are shown in Table II for the material which was free of fusion zone undercutting and in Table II for the material which exhibited fusion weld zone undercutting. The other elements listed in Tables II and III were investigated within the composition ranges shown and were found not to have any significant effect on fusion zone undercutting.

TABLE II.—COMPOSITION OF SATISFACTORY WELDS

| Heat No. | Composition (by weight percent) | | | | | | | | | | | | | | | |
|---|---|---|---|---|---|---|---|---|---|---|---|---|---|---|---|---|
| | C | Mn | Si | S | P | Cr | W | Fe | Ni | Mo | Co | Zr | B | Mg | Al | Ca |
| 1 | .081 | .53 | .80 | .007 | .015 | 22.18 | .60 | 17.73 | Bal | 8.28 | 1.54 | .030 | *ND | .0025 | .18 | .0014 |
| 2 | .10 | .75 | .78 | .015 | .016 | 22.26 | .62 | 18.88 | Bal | 8.34 | 1.47 | .045 | .0006 | .0020 | .14 | .0050 |
| 3 | .073 | .70 | .59 | .013 | .013 | 20.88 | .53 | 19.40 | Bal | 8.29 | 1.06 | .092 | .0005 | .0014 | .23 | .0036 |
| 4 | .080 | .64 | .84 | .005 | .013 | 22.15 | .57 | 17.73 | Bal | 8.32 | .86 | .083 | *ND | .0061 | .20 | .0044 |
| 5 | .070 | .67 | .54 | .008 | .019 | 20.80 | .56 | 19.28 | Bal | 8.35 | .95 | .074 | .0027 | .0017 | .17 | .0017 |
| 6 | .070 | .65 | .56 | .008 | .020 | 21.06 | .58 | 18.32 | Bal | 8.47 | 1.05 | .073 | .0016 | .0020 | .18 | .0024 |
| 7 | .073 | .70 | .56 | .007 | .015 | 21.04 | .58 | 19.55 | Bal | 8.30 | 1.17 | .079 | .0035 | .0025 | .17 | .0023 |
| 8 | .083 | .69 | .69 | .009 | .017 | 21.02 | .56 | 19.00 | Bal | 8.36 | 1.24 | .079 | .0035 | .0026 | .19 | .0035 |
| 9 | .078 | .75 | .72 | .010 | .016 | 21.29 | .63 | 18.05 | Bal | 8.31 | 1.09 | .073 | .0027 | .0019 | .20 | .0032 |
| 10 | .075 | .72 | .72 | .005 | .014 | 21.36 | .64 | 17.83 | Bal | 8.55 | 1.14 | .100 | .0040 | .0029 | .22 | .0028 |
| 11 | .082 | .72 | .66 | .007 | .013 | 21.70 | .60 | 17.72 | Bal | 8.37 | 1.11 | .100 | .0053 | .0052 | .17 | .0041 |
| 12 | .073 | .66 | .70 | .007 | .013 | 20.82 | .60 | 18.46 | Bal | 8.33 | 1.06 | .095 | .0033 | .0022 | .23 | .0024 |
| 13 | .073 | .58 | .61 | .007 | .015 | 21.85 | .58 | 18.26 | Bal | 8.53 | 1.18 | .073 | .0038 | .0034 | .11 | .0011 |
| 14 | .065 | .89 | .58 | .007 | .015 | 21.04 | .63 | 18.85 | Bal | 8.43 | 1.24 | .073 | .0032 | .0018 | .09 | .0017 |
| 15 | .067 | .84 | .71 | .013 | .017 | 20.86 | .68 | 19.44 | Bal | 8.22 | 1.42 | .088 | .0019 | .0021 | .16 | .0040 |
| 16 | .063 | .70 | .64 | .010 | .016 | 21.32 | .63 | 19.21 | Bal | 8.38 | 1.08 | .077 | .0024 | .0043 | .12 | .0032 |
| 17 | .061 | .82 | .65 | .007 | .015 | 21.77 | .63 | 17.73 | Bal | 9.05 | 1.48 | .074 | .0015 | .0030 | .10 | .0031 |
| 18 | .065 | .81 | .57 | .007 | .015 | 21.66 | .52 | 18.24 | Bal | 8.35 | 1.34 | .100 | .0020 | .0041 | .14 | .0034 |
| 19 | .098 | .75 | .65 | .007 | .015 | 21.25 | .58 | 18.25 | Bal | 8.57 | 1.25 | .089 | .0031 | .0018 | .10 | .0014 |
| 20 | .073 | .67 | .62 | .013 | .016 | 21.17 | .51 | 18.29 | Bal | 8.52 | 1.29 | .069 | .0031 | .0026 | .13 | .0036 |
| 21 | .077 | .75 | .69 | .011 | .017 | 21.78 | .61 | 17.80 | Bal | 8.35 | 1.54 | .072 | .0024 | .0041 | .14 | .0048 |
| 22 | .069 | .66 | .63 | .010 | .016 | 21.92 | .61 | 17.48 | Bal | 8.68 | 1.27 | .085 | .0038 | .0038 | .16 | .0035 |
| 23 | .060 | .79 | .43 | .010 | .016 | 21.52 | .60 | 18.36 | Bal | 8.42 | 1.21 | .040 | .0027 | .0022 | .10 | .0034 |
| 24 | .080 | .67 | .52 | .009 | .015 | 21.48 | .75 | 18.68 | Bal | 8.20 | 1.93 | .065 | .0040 | *ND | .12 | .0020 |
| 25 | .069 | .73 | .69 | .010 | .017 | 21.11 | .77 | 19.47 | Bal | 8.20 | 1.54 | .07 | .0040 | *ND | .071 | .0035 |
| 26 | .079 | .68 | .71 | .007 | .017 | 21.23 | .76 | 19.42 | Bla | 8.25 | 1.49 | .057 | .0039 | *ND | .13 | .0026 |
| 27 | .070 | .76 | .64 | .008 | .015 | 21.22 | .57 | 19.53 | Bal | 8.27 | 1.17 | .068 | .0031 | .0037 | .12 | .0036 |
| 28 | .092 | .73 | .71 | .007 | .015 | 21.37 | .63 | 19.55 | Bal | 8.30 | 1.52 | .065 | .0020 | .0030 | .23 | .0012 |
| 29 | .090 | .49 | .54 | .007 | .007 | 21.70 | .68 | 18.50 | Bal | 8.92 | .03 | .05 | .0035 | *ND | .16 | .0015 |

*ND=Not determined.

TABLE III.—COMPOSITION OF UNSATISFACTORY WELDS

| Heat No. | C | Mn | Si | S | P | Cr | W | Fe | Ni | Mo | Co | Zr | B | Mg | Al | Ca |
|---|---|---|---|---|---|---|---|---|---|---|---|---|---|---|---|---|
| 1 | .065 | .69 | .87 | .003 | .015 | 21.48 | .58 | 18.90 | Bal | 8.25 | 1.29 | .045 | *ND | .0061 | .31 | .0034 |
| 2 | .099 | .71 | .72 | .015 | .012 | 20.99 | .60 | 18.25 | Bal | 8.34 | 1.47 | .061 | .0006 | .0027 | .17 | .0096 |
| 3 | .068 | .62 | .84 | .007 | .014 | 21.23 | .63 | 17.84 | Bal | 8.45 | 1.01 | .086 | *ND | .0016 | .34 | .0014 |
| 4 | .057 | .65 | .61 | .011 | .011 | 20.99 | .55 | 18.93 | Bal | 8.31 | .80 | .087 | .0004 | .0010 | .58 | .0010 |
| 5 | .087 | .56 | .61 | .013 | .013 | 21.11 | .58 | 18.39 | Bal | 8.30 | 1.33 | .095 | .0004 | .0031 | .35 | .0028 |
| 6 | .058 | .75 | .77 | .013 | .014 | 21.00 | .63 | 18.64 | Bal | 8.38 | .94 | .095 | .0004 | .0014 | .38 | .0028 |
| 7 | .086 | .71 | .65 | .013 | .012 | 21.34 | .56 | 18.05 | Bal | 8.37 | .85 | .095 | .0031 | .0055 | .17 | .0073 |
| 8 | .059 | .66 | .55 | .013 | .012 | 21.39 | .60 | 17.73 | Bal | 8.45 | .88 | .089 | .0006 | .0016 | .17 | .0089 |
| 9 | .089 | .71 | .55 | .011 | .017 | 21.65 | .60 | 18.43 | Bal | 8.42 | 1.01 | .081 | .0027 | .0020 | .30 | .0066 |
| 10 | .073 | .69 | .65 | .006 | .015 | 21.16 | .58 | 18.50 | Bal | 8.35 | 1.17 | .089 | .0041 | *ND | .31 | .0037 |
| 11 | .079 | .67 | .58 | .010 | .017 | 21.21 | .59 | 18.05 | Bal | 8.40 | 1.23 | .087 | .0016 | .0022 | .36 | .0045 |
| 12 | .083 | .68 | .76 | .010 | .018 | 20.96 | .51 | 18.70 | Bal | 8.37 | 1.17 | .077 | .0044 | .0030 | .23 | .0050 |
| 13 | .070 | .55 | .59 | .010 | .017 | 21.61 | .59 | 18.32 | Bal | 8.36 | 1.01 | .087 | .0020 | .0031 | .22 | .0077 |
| 14 | .079 | .61 | .52 | .007 | .018 | 20.98 | .60 | 17.98 | Bal | 8.53 | 1.25 | *ND | .0033 | .0023 | .16 | .0065 |
| 15 | .085 | .63 | .67 | .007 | .009 | 20.72 | .54 | 19.83 | Bal | 8.25 | 1.48 | .076 | .0033 | *ND | .40 | .0014 |
| 16 | .096 | .66 | .56 | .011 | .018 | 21.60 | .57 | 19.07 | Bal | 8.40 | 1.09 | .087 | .0026 | .0031 | .18 | .0078 |
| 17 | .079 | .53 | .54 | .005 | .017 | 20.82 | .57 | 19.21 | Bal | 8.32 | 1.09 | .077 | .0041 | .0050 | .32 | .0021 |
| 18 | .077 | .64 | .76 | .005 | .014 | 21.34 | .56 | 18.85 | Bal | 8.31 | 1.17 | .076 | .0053 | .0058 | .50 | .0007 |
| 19 | .080 | .70 | .69 | .008 | .017 | 21.02 | .56 | 19.00 | Bal | 8.36 | 1.24 | .084 | .0022 | .0042 | .19 | .0055 |
| 20 | .075 | .72 | .71 | .007 | .014 | 21.29 | .63 | 18.05 | Bal | 8.31 | 1.09 | .089 | .0031 | .0021 | .19 | .0054 |
| 21 | .099 | .47 | .51 | .011 | .017 | 21.46 | .56 | 18.31 | Bal | 8.41 | 1.11 | .085 | .0022 | .0022 | .21 | .0118 |
| 22 | .084 | .72 | .69 | .007 | .012 | 21.33 | .57 | 18.29 | Bal | 8.49 | 1.09 | .070 | .0039 | .0044 | .28 | .0022 |
| 23 | .069 | .90 | .66 | .005 | .016 | 21.47 | .59 | 17.68 | Bal | 8.53 | 1.13 | .096 | .0040 | .0028 | .17 | .0095 |
| 24 | .064 | .62 | .70 | .005 | .016 | 21.47 | .60 | 18.70 | Bal | 8.47 | 1.17 | .090 | .0038 | .0037 | .20 | .0043 |
| 25 | .067 | .70 | .58 | .008 | .016 | 21.01 | .66 | 18.88 | Bal | 8.00 | 1.13 | .088 | .0031 | .0033 | .22 | .0092 |
| 26 | .060 | .67 | .60 | .007 | .015 | 21.21 | .67 | 19.21 | Bal | 8.42 | 1.18 | .090 | .0015 | .0026 | .27 | .0073 |
| 27 | .050 | .67 | .65 | .009 | .012 | 21.09 | .65 | 18.93 | Bal | 8.44 | 1.41 | .076 | .0043 | .0019 | .26 | .0073 |
| 28 | .070 | .64 | .54 | .009 | .016 | 21.06 | .58 | 18.70 | Bal | 8.45 | 1.46 | .093 | .0032 | .0035 | .20 | .0064 |
| 29 | .069 | .74 | .58 | .009 | .015 | 21.08 | .54 | 18.60 | Bal | 8.50 | 1.28 | .094 | .0033 | .0025 | .22 | .0055 |
| 30 | .070 | .73 | .57 | .011 | .017 | 21.08 | .54 | 18.60 | Bal | 8.50 | 1.28 | .085 | .0030 | .0029 | .21 | .0074 |
| 31 | .092 | .65 | .58 | .011 | .016 | 20.96 | .56 | 18.55 | Bal | 8.40 | 1.23 | .094 | .0031 | .0037 | .32 | .0082 |
| 32 | .120 | .69 | .68 | .011 | .016 | 21.61 | .51 | 18.36 | Bal | 8.45 | 1.21 | .092 | .0033 | .0029 | .28 | .0028 |
| 33 | .062 | .74 | .47 | .010 | .015 | 21.15 | .64 | 17.70 | Bal | 8.84 | 1.19 | .046 | .0026 | .0033 | .11 | .0093 |
| 34 | .064 | .66 | .70 | .007 | .014 | 21.64 | .66 | 18.57 | Bal | 9.40 | 1.24 | .087 | .0042 | .0043 | .14 | .0097 |
| 35 | .070 | .62 | .61 | .008 | .017 | 21.22 | .57 | 19.00 | Bal | 8.42 | 1.05 | .089 | .0053 | .0053 | .14 | .0099 |

*ND=Not determined.

We claim:

1. A heat resistant solid solution strengthened nickel base alloy consisting essentially of 0.15% max. carbon, 1.00% max. manganese, 1.0% max. silicon, 14.5–23.0% chromium, 2.5% max. cobalt, 0.010% max. boron, 8.0–17.0% molybdenum, 0–3.45% tungsten, 0–4.15% columbium, 0.15% max. zirconium, 20.0% max, iron and the balance nickel, including at least trace amounts of calcium and aluminum and represented by the limiting equation $Al + 31.8\ Ca < 3{,}500$ parts per million and characterized by substantial freedom from fusion zone undercutting in the fabricated state.

2. A heat resistant solid solution strengthened nickel base alloy consisting essentially of 0.15% max. carbon, 1.00% max. manganese, 1.0% max. silicon, 20.5–23.0% chromium, .5–2.5% cobalt, 0.010% max. boron, 0.15% max. zirconium, .20–1.00% tungsten, 17.0–20.0% iron, 8.0–10.0% molybdenum and the balance nickel, including at least trace amounts of calcium and aluminum and represented by the limiting equation $Al + 31.8\ Ca < 3{,}500$ parts per million and characterized by substantial freedom from fusion zone undercutting in the fabricated state.

3. A method of producing a solution hardenable alloy characterized by freedom from fusion zone undercutting in the fabricated state comprising alloying amounts of aluminum and calcium into a base alloy in amounts represented by the limiting equation $Al + 31.8\ Ca < 3{,}500$ parts per million, said base alloy consisting essentially of 0.15% max. carbon, 1.00% max. manganese, 1.0% max. silicon, 14.5–23.0% chromium, 2.5% max. cobalt, 0.010% max. boron, 8.0–17.0% molybdenum, 0–3.45% tungsten, 0–4.15% columbium, 0.15% max. zirconium, 20.0% max. iron and the balance nickel.

4. A method of producing a solution hardenable alloy characterized by freedom from fusion zone undercutting in the fabricated state comprising alloying amounts of aluminum and calcium into a base alloy in amounts represented by the limiting equation $Al + 31.8\ Ca < 3{,}500$ parts per million, said base alloy consisting essentially of 0.15% max. carbon, 1.00% max. manganese, 1.0% max. silicon, 20.5–23.0% chromium, .5–2.5% cobalt, 0.010% max. boron, 0.15% max. zirconium, 0.20–1.00% tungsten, 17.0–20.0% iron, 8.0–10.0% molybdenum and the balance nickel.

\* \* \* \* \*

UNITED STATES PATENT OFFICE
CERTIFICATE OF CORRECTION

Patent No. 3,650,734  Dated March 21, 1972

Inventor(s) Thomas A. Kantor and Ronald K. Bowen

It is certified that error appears in the above-identified patent and that said Letters Patent are hereby corrected as shown below:

Column 4 Line 42 --Table II-- should read --Table III--. In Table II, Heat No. 26 under the formula Ni --Bla-- should read --Bal--. In Table III, Heat No. 34 under the formula Mo --9.40-- should read --8.40--.

Signed and sealed this 11th day of July 1972.

(SEAL)
Attest:

EDWARD M. FLETCHER, JR.
Attesting Officer

ROBERT GOTTSCHALK
Commissioner of Patents